(No Model.)
J. M. DODGE.
GATE FOR CONVEYER TROUGHS.
No. 489,289. Patented Jan. 3, 1893.
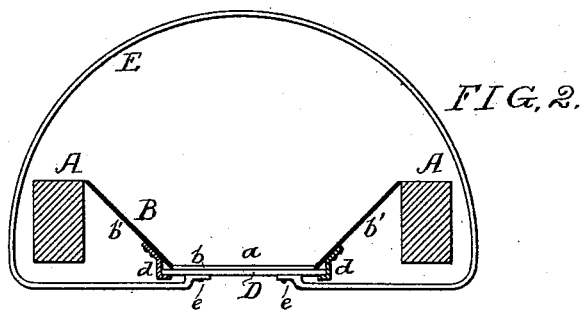
FIG. 2.
FIG. 1.
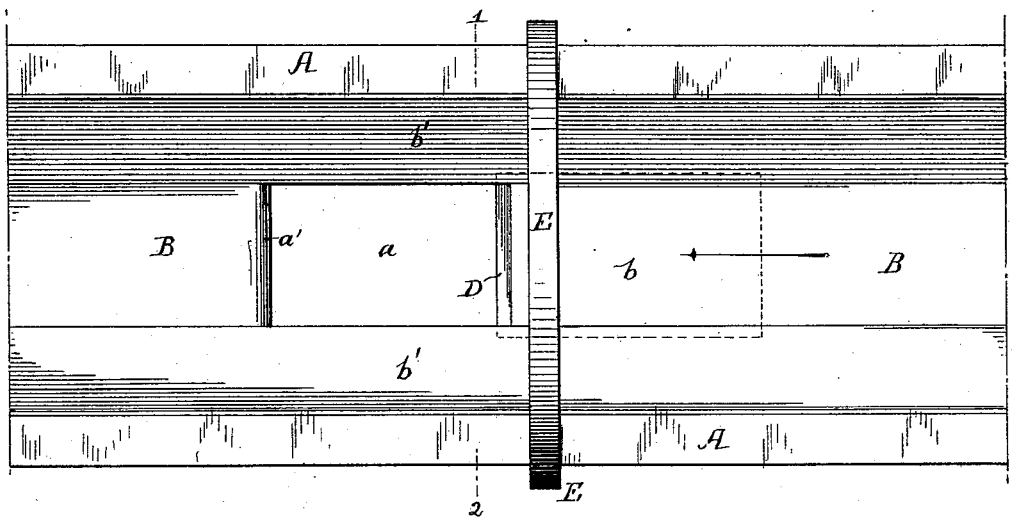
FIG. 3.
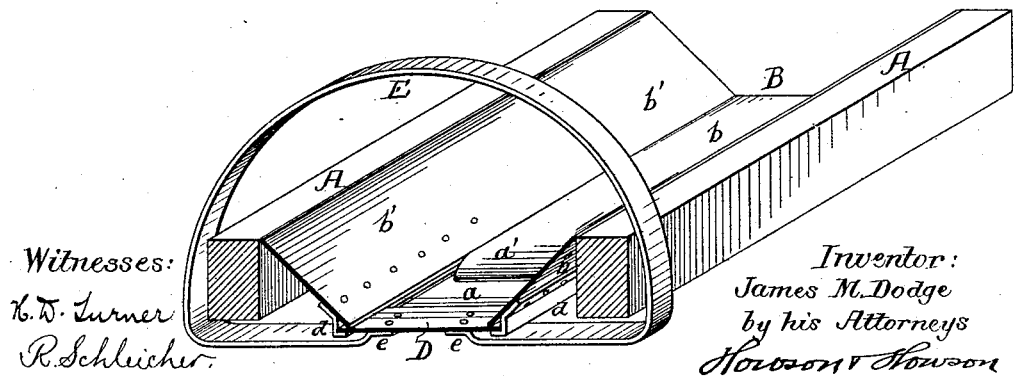
Witnesses:
K. D. Turner
R. Schleicher
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

GATE FOR CONVEYER-TROUGHS.

SPECIFICATION forming part of Letters Patent No. 489,289, dated January 3, 1893.

Application filed August 31, 1892. Serial No. 444,641. (No model.)

*To all whom it may concern:*

Be it known that I, JAMES M. DODGE, a citizen of the United States, and a resident of Philadelphia, Pennsylvania, have invented certain Improvements in Gates for Conveyer-Troughs, of which the following is a specification.

The object of my invention is to so construct the trough of mechanism for conveying granular material and material in lump that its gates can be readily moved and closed without interfering with the conveyer. This object I attain in the following manner, reference being had to the accompanying drawings, in which—

Figure 1, is a plan view of a trough illustrating my improved gate; Fig. 2, is a transverse section on the line 1—2, Fig. 1; Fig. 3, is a perspective view of sufficient of the trough to illustrate my invention.

A, A, are the stringers running the full length of the trough. These stringers support the trough B, as clearly shown in Fig. 2. This trough is made preferably of sheet metal having a flat bottom $b$ and inclined sides $b'$.

$a$ is a quadrangular opening in the bottom of the trough through which the material that may be conveyed along the trough can discharge. This opening is preferably quadrangular and extends from side to side of the trough, and one edge $a'$ is turned down, as shown clearly in Fig. 3, to form a beveled lip for the gate D to ride upon. This gate is adapted to, and supported by, rails $d$ of the form clearly shown in Fig. 2, which are secured to the sides of the trough by rivets or other fastenings.

Secured in the present instance to the underside of the gate D at $e\ e$ is a bail E which extends around the stringers A A and over the trough, as clearly shown in Fig. 2, so that the gate can be moved longitudinally from above to close or open the discharge opening, thus avoiding the necessity of the operator reaching down under the trough to open or close the gate, this arrangement also simplifying the construction of the conveying mechanism. The gate being mounted directly under the bottom of the trough, the lip $a'$ is turned down so that the edge of the gate will ride upon the lip, thus dispensing with any projections which would be likely to impede the progress of the flights of the conveyer, as the flights travel in the direction of the arrow shown in Fig. 1.

I claim as my invention:—

The combination of the stringers, the trough attached thereto, and having a quadrangular opening therein, a lip $a'$, on one edge of said opening a gate adapted to slide upon rails carried by the trough, and to close the opening and ride upon the lipped portion with mechanism for operating said gate, substantially as specified.

In testimony whereof I have signed my name to this specification in the presence of two subscribing witnesses.

JAMES M. DODGE.

Witnesses:
HENRY HOWSON,
JOSEPH H. KLEIN.